United States Patent [19]

Schlatter et al.

[11] Patent Number: 4,781,285

[45] Date of Patent: Nov. 1, 1988

[54] SOFT TOUCH DRIVE FOR ARTICLE HANDLING APPARATUS

[75] Inventors: Howard Schlatter, Rochester Hills; Lawrence A. Wisne, Farmington Hills, both of Mich.

[73] Assignee: Progressive Tool & Industries Company, Southfield, Mich.

[21] Appl. No.: 98,866

[22] Filed: Sep. 21, 1987

[51] Int. Cl.⁴ .............................................. B65G 25/00
[52] U.S. Cl. ...................................... 198/774; 414/750
[58] Field of Search ................ 198/774; 414/745, 83, 414/905, 750; 74/84 R, 99 R, 104; 254/84

[56] References Cited

U.S. PATENT DOCUMENTS

| | | |
|---|---|---|
| 287,066 | 10/1883 | Thom . |
| 761,914 | 6/1904 | Riggs . |
| 1,051,616 | 1/1913 | Moore . |
| 1,473,901 | 11/1923 | Hettrich . |
| 2,509,161 | 5/1950 | Meyers ................................. 74/422 |
| 2,512,894 | 6/1950 | Gieskieng ............................ 74/436 |
| 2,895,281 | 7/1959 | Young et al. ........................ 56/221 |
| 3,361,005 | 1/1968 | Carpenter ............................ 74/436 |
| 3,396,856 | 8/1968 | Diepeveen ............................ 214/1 |
| 3,420,517 | 1/1969 | Snellman et al. .................... 74/84 R |
| 3,552,061 | 1/1971 | Hermann ............................. 49/351 |
| 3,680,399 | 8/1972 | Brems .................................. 74/89 |
| 3,683,708 | 8/1972 | Dwyer ................................. 74/84 R |
| 3,715,102 | 2/1973 | Braselmann ......................... 254/96 |
| 3,827,312 | 8/1974 | Bristol et al. ...................... 74/84 R X |
| 4,011,764 | 3/1977 | Buck et al. ......................... 74/499 |
| 4,050,571 | 9/1977 | Kushigian ........................... 198/774 |
| 4,209,087 | 6/1980 | Kushigian ....................... 198/774 X |
| 4,211,321 | 7/1980 | Mosher ............................... 198/774 |
| 4,397,174 | 8/1983 | Jungesso ........................ 198/774 X |
| 4,407,405 | 10/1983 | Rise ................................... 198/774 |
| 4,407,406 | 10/1983 | Norris ................................ 198/774 |
| 4,507,950 | 4/1985 | Elhaus ........................... 198/774 X |
| 4,669,607 | 6/1987 | Mason ................................ 198/774 |

Primary Examiner—Robert J. Spar
Assistant Examiner—D. Glenn Dayoan
Attorney, Agent, or Firm—Basile and Hanlon

[57] ABSTRACT

A drive for an article transfer device in which a carrier is driven into contact with a stationary part to lift the part upwardly from a stationary support employs a drive motor which provides a constant speed input during a lifting cycle. The constant speed input is transmitted to the carrier by a motion transmission mechanism which drives the carrier in an elevating stroke in which the velocity of the carrier is momentarily reduced to zero at the instant the carrier contacts the part to avoid an undesirable impact between the carrier and part. The mechanism may be set up to accommodate contacting the part at a predetermined point other than the midpoint of the carrier stroke and includes a mechanism which operates at a maximum mechanical advantage at the time of part contact.

15 Claims, 9 Drawing Sheets

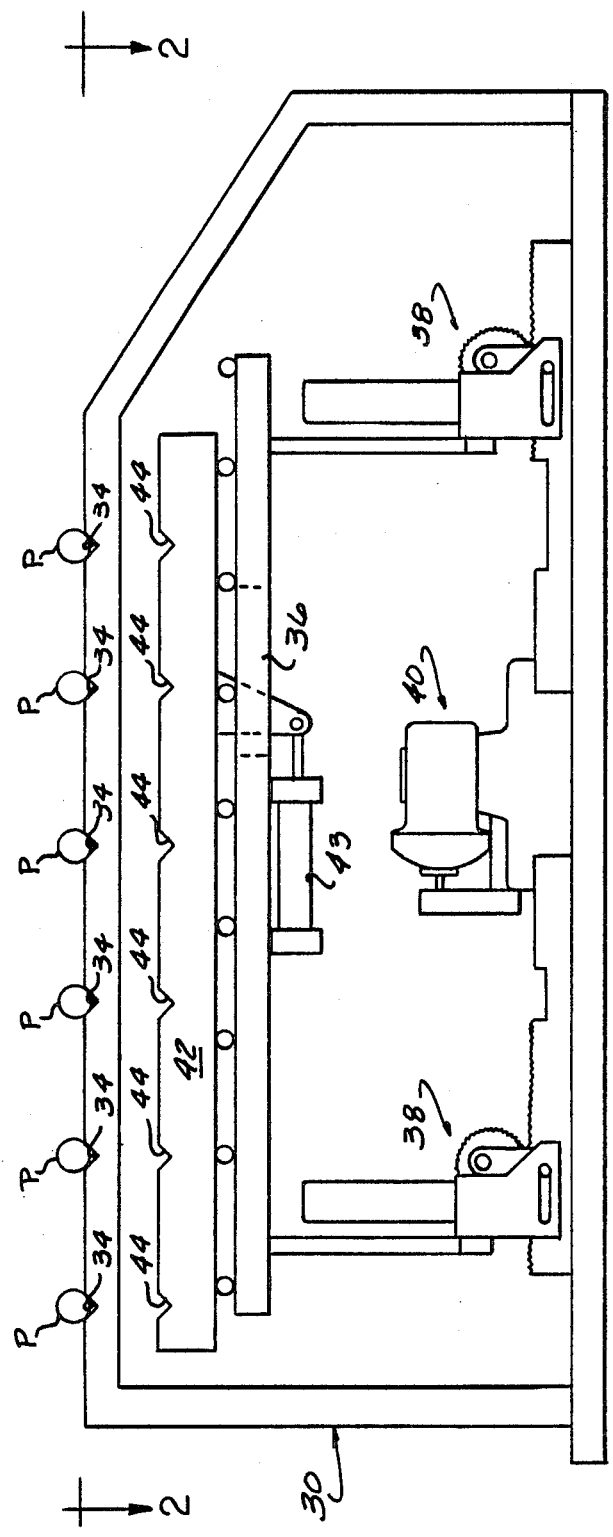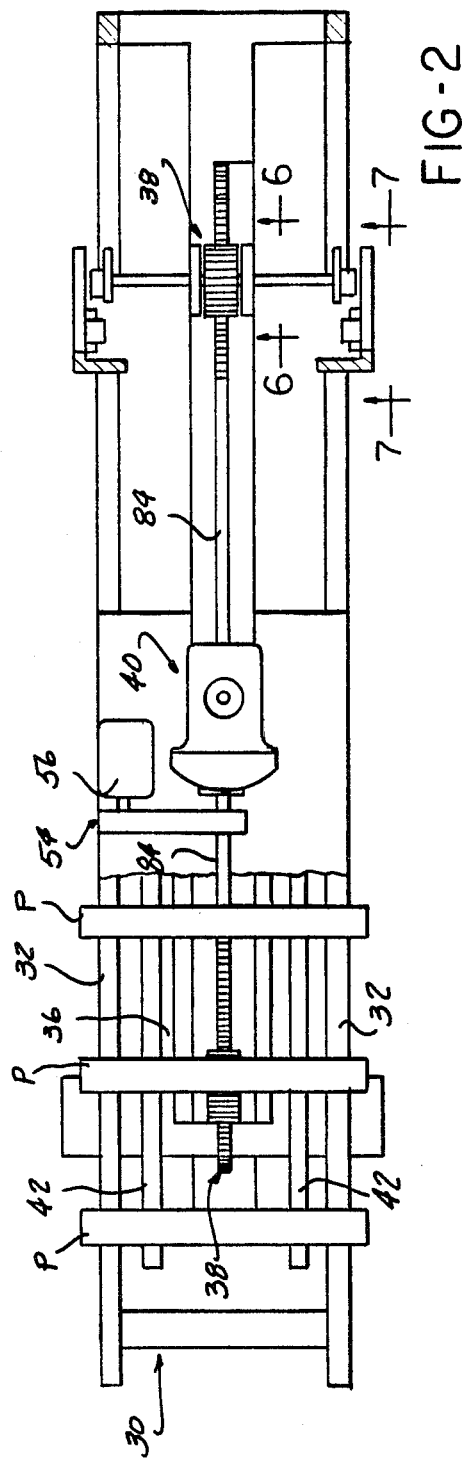

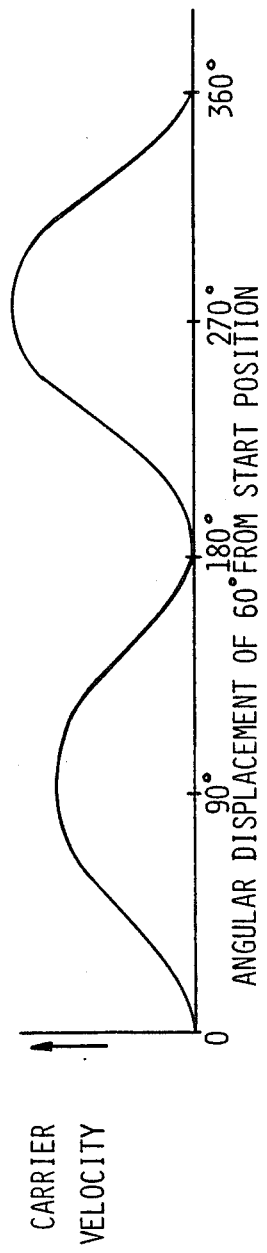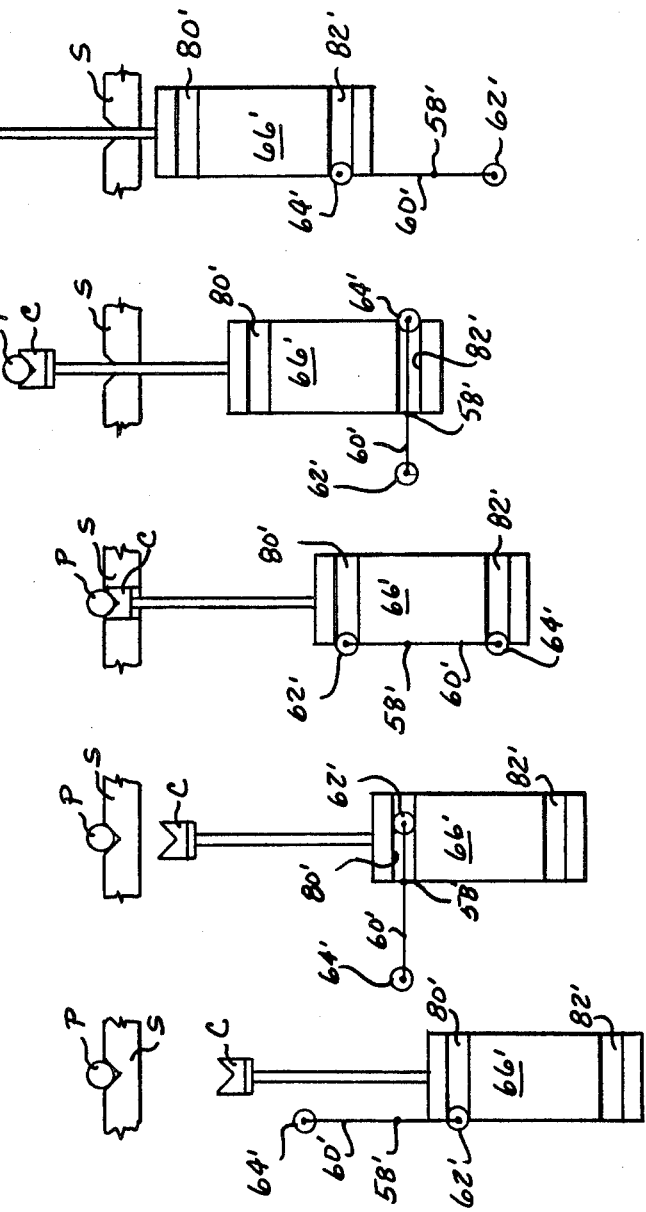
FIG-15 FIG-10 FIG-11 FIG-12 FIG-13 FIG-14

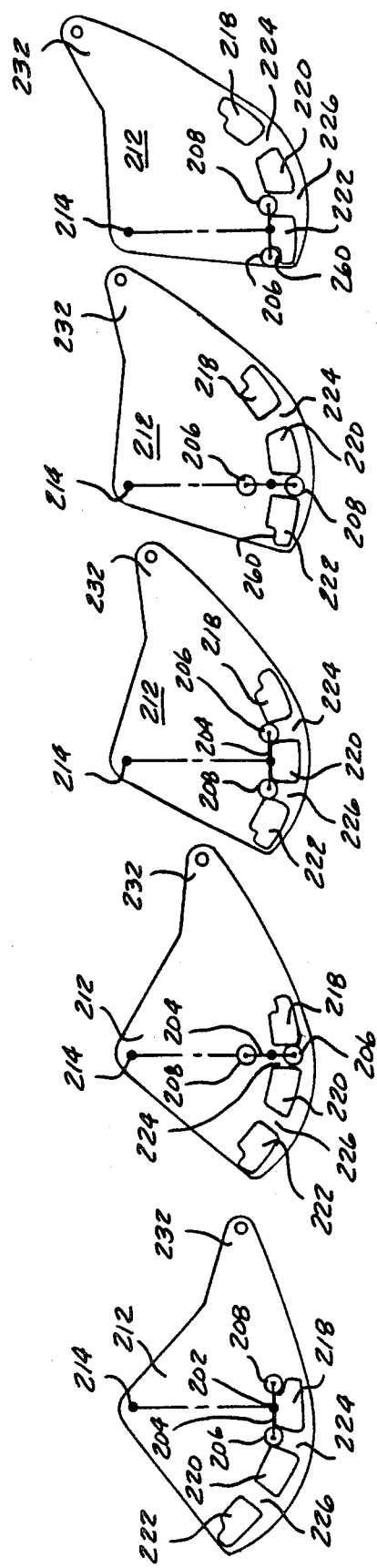

SOFT TOUCH DRIVE FOR ARTICLE HANDLING APPARATUS

BACKGROUND OF THE INVENTION

The present invention is concerned with drive mechanisms employed in article handling apparatus in which an article or part is located upon a support in a stationary ready position in the path of movement of a retracted part transfer member. The part transfer member is then driven from its retracted position in a working stroke in which the transfer member moves from its retracted position into engagement with the part and lifts the part from its support to an elevated position clear of the support.

One example of such an apparatus is a lift and carry conveyor in which parts are advanced in step-by-step movement along a fixed support by a carrier which is cyclically actuated in a four step cycle in which during a lifting stroke the carrier lifts the parts clear from the fixed support, then advances the parts forwardly one step and then lowers the parts back onto the support. The carrier is then returned beneath the parts to its original start position.

In another type of apparatus, the transfer member or carrier may move upwardly beneath a part temporarily located at a ready position in a transfer machine and lift the part from its ready position into operative alignment with a tool or part receiving clamp.

The apparatuses generally described above require the carrier, when in its stationary start position, be spaced below the part when the part is located in its ready position so that the part can move into its ready position without interference from the carrier. The drive which drives the carrier in its lifting stroke must be arranged so that the carrier is smoothly decelerated to a stop as it reaches the upper end of its lifting stroke.

Typically, such drives employ a crank mounted for rotary oscillation about a horizontal axis with a roller at the distal end of the crank received within a horizontal slot in the carrier. Typically, the crank is so oriented that the slot engaging roller of the crank is at its twelve o'clock position relative to the crank axis when the carrier is at the upper end of its stroke, this arrangement providing a smooth decrease in the upward velocity of the carrier to a zero upward velocity as the carrier arrives at the upper end limit of its stroke. Assuming that rotation of the crank is continuous through its lifting stroke cycle, this means that the carrier will be moving upwardly with a positive upward velocity at the moment it contacts the stationary part, typically at or close to the mid point of its upward stroke. Because the crank radius is fixed, the upward velocity of the carrier at the instant it contacts the part is directly dependent upon the speed of the motor employed to drive the crank in rotation at that instant. If, in the simplest approach, the drive motor drives at a substantially constant speed at least during the midpoint of its cycle, this constant speed must be limited to one which will not result in an unduly high impact between the carrier and part. If, on the other hand, the motor is slowed to a reduced speed as the carrier approaches the part, the total cycle time will obviously be substantially increased unless the control accelerates the motor after it contacts the part. In many arrangements, the geometry of the system is such that the mechanical advantage of the crank is substantially reduced or at a minimum at the instant it contacts the part, which will impose a substantial load on the drive motor if the drive motor is required to accelerate the carrier at this point.

The present invention is especially directed to a "soft touch" drive mechanism in which a drive motor which drives at a substantially constant speed through a given drive cycle will drive a carrier member in a working stroke in which the velocity of the carrier is momentarily reduced to zero at the moment it contacts the part—i.e. the carrier engages the part with an impactless "soft touch"—and in which the drive mechanism operates at a maximum mechanical advantage during those portions of the cycle when the carrier is moving at minimum speed. The mechanism is so designed that engagement between the carrier and part need not occur at the exact midpoint of the carrier stroke.

SUMMARY OF THE INVENTION

In accordance with the present invention, a rotary member is mounted for rotation about a fixed axis and is driven in substantially constant speed rotation about this axis by a drive motor controlled to drive the rotary member in discrete single revolution cycles of 360° rotation with the direction of rotation of the carrier during one cycle being in the opposite direction from the direction of rotation during the preceding cycle.

The rotary member carries a pair of rollers mounted on the rotary member for rotation about respective axes which are parallel to and radially offset from the fixed axis at substantially diametrically opposed positions on the rotary member.

In one form of the invention, a motion transmission member is mounted for reciprocating movement along a straight line path lying in a general plane normal to the fixed axis of rotation of the rotary member. In the side of the transmission member facing the rotary member, a pair of roller receiving slots are cut. In this embodiment, the two roller axes are spaced at positions 180° apart about the fixed axis of the rotary member and the two slots on the transmission member are spaced from each other by a distance equal to the straight line distance between the two roller axes. The opposed walls of the slots lie in general planes normal to the path of movement of the transmission member and the opposite walls of the slots are spaced from each other by a distance slightly exceeding the roller diameter so that as the rotary member is rotated, the roller can roll along one wall of the slot to drive the rotary member with a slight clearance from the opposite wall of the slot.

When the drive mechanism is in a start position, ready to drive the transmission member in a forward or working stroke, the roller axes and the fixed axis of the rotary member lie on a straight line parallel to the fixed path of the transmission member. One roller is at this time engaged at one end of the forwardmost slot on the transmission member while the other roller is spaced forwardly from this slot.

The drive motor is then actuated to drive the rotary member in a direction such that the roller engaged in the forward slot of the transmission member moves into this slot, and at the same time engages the forward wall of that slot to drive the transmission member forwardly. During the first 90° of rotation of the rotary member, the roller moves more deeply into the forward slot and the velocity of the transmission member increases sinusoidaly from zero to a maximum forward velocity as the rotary member reaches a position 90° displaced from its start position. Throughout the next 90° of rotation of the rotary member, the roller moves back toward its original position at the end of the slot and the velocity of the transmission member decreases to become zero as the rotary member reaches a position displaced 180° from its start position.

As the rotary member passes its 180° position, the first roller is carried outwardly beyond the end of its slot, while at the same instant the other roller moves into the corresponding end of the rearward slot in the transmission member.

During the second 180° of rotation of the rotary member, the transmission member is driven by the engagement between the second roller and the forward wall of the rearward slot. Rotation of the rotary member is stopped upon the completion of a single revolution of 360° from its start position. During this 360° rotation, the transmission member is driven by the first roller through the first 180° of rotation of the rotary member and is driven in the same direction through the final 180° of revolution of the rotary member by the second roller. The transmission member is accelerated from a dead stop to a maximum velocity during the first 90° of rotation of the rotary member, decelerated to a dead stop during the second 90° of rotation of the rotary member, then again accelerated to a maximum velocity as the rotary member rotates from 180° to 270° from its start position, and then decelerated to a dead stop as the rotary member reaches its 360° position. The displacement of the transmission member from its start position is equal to twice the radial distance between the fixed axis and first roller axis during the first 180° of rotation of the rotary member and the transmission is further displaced during the final 180° of movement of the rotary member through a distance equal to twice the radial distance between the fixed axis and second roller axis. The total stroke of the transmission member is thus twice the distance between the two roller axes and the velocity of the transmission member during its stroke will be reduced to zero when the rotary member has completed its first half revolution.

The transmission member is coupled to the part engaging carrier so that the carrier engages the part when the rotary member is at this 180° displacement from its start position. However, this point of engagement need not be at the exact midpoint of the working stroke of the carrier. If the radial distance between the fixed axis and the roller axes is the same for both rollers, the carrier will engage the part at the exact midpoint of its stroke. If the radial distance from the fixed axis to the first roller axis is less than the radial distance from the fixed axis to the second roller axis, then the carrier will engage the part at some point below the midpoint of its upper stroke.

In a second embodiment of the invention, the motion transmission member is mounted for rotary oscillation about a second fixed axis parallel to, but offset from, the fixed axis of rotation of the rotary member. The roller engaging slots in this rotatable transmission member are cut along radii from its axis of rotation and angularly spaced about this axis by a spacing such that the first roller engages the forward wall of one slot through the first 180° rotation of the rotary member and is then disengaged from its slot as the second roller moves into the other slot to drive the transmission member through the final 180° rotation of the drive cycle of the rotary member. Again, the rotary velocity of the transmission member is reduced to zero momentarily as the rotary member moves past its 180° displacement from its start position.

Other objects and features of the invention will become apparent by reference to the following specification and to the drawings.

IN THE DRAWINGS

FIG. 1 is a simplified schematic side elevational view of a lift and carry conveyor employing one from of drive embodying the present invention;

FIG. 2 is an offset cross-sectional view of the conveyor schematically shown in FIG. 1;

Figure 16:
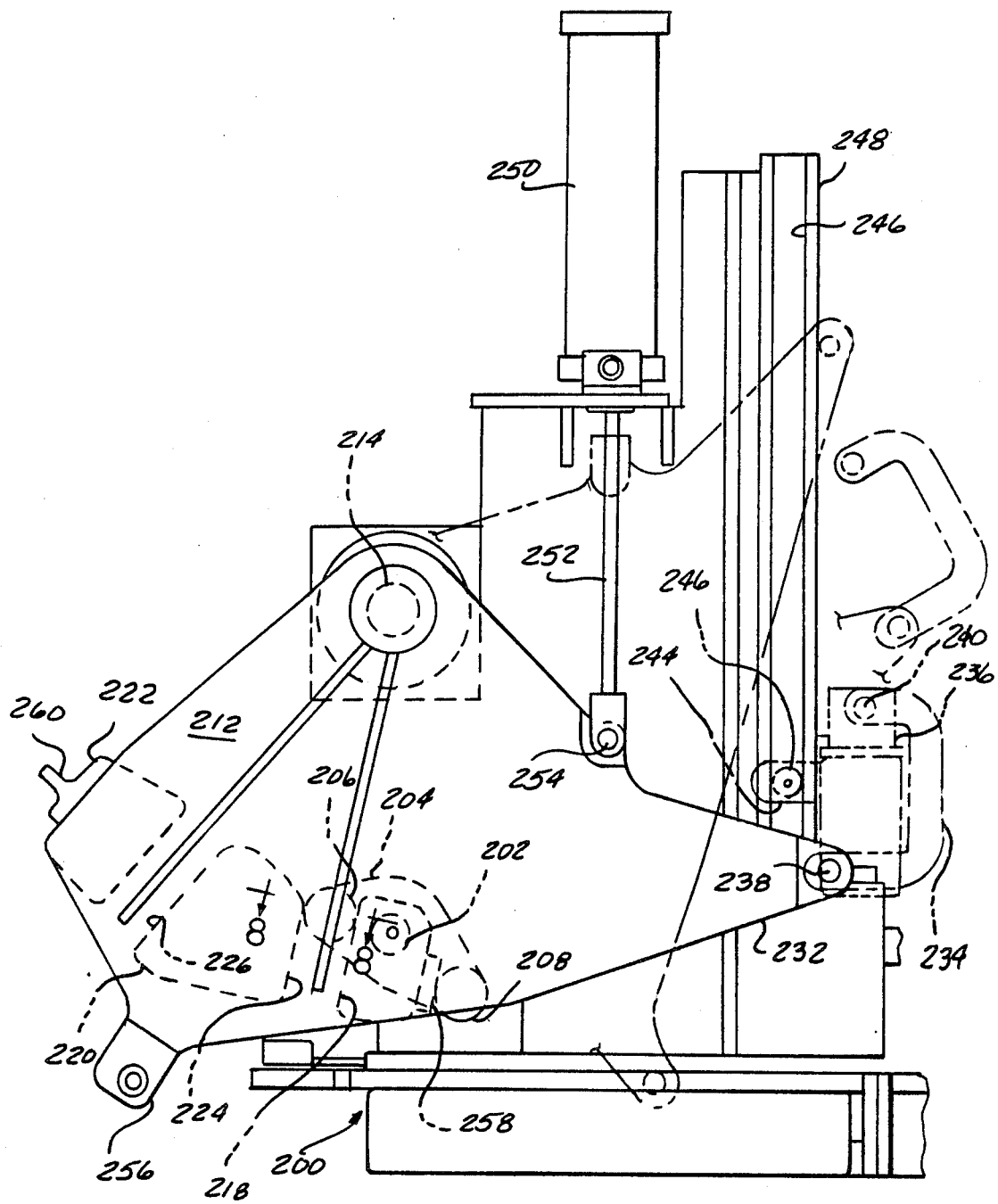
Figure 17:
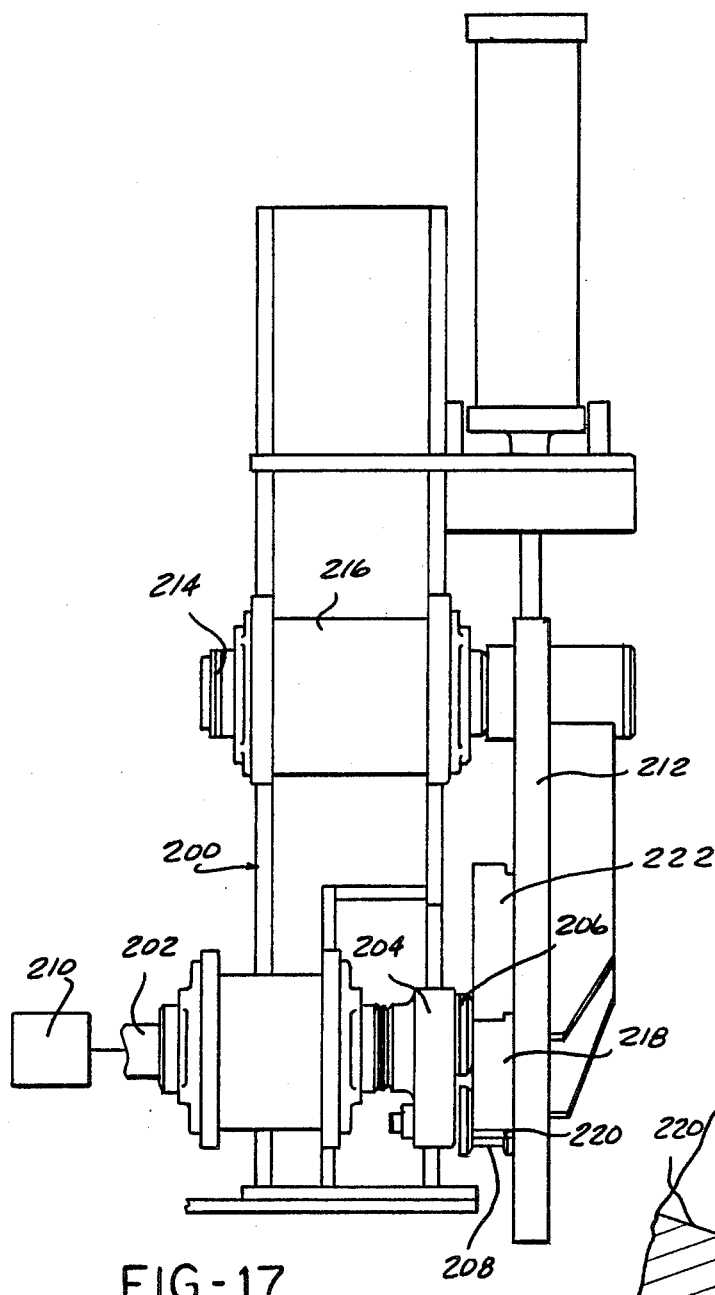
Figure 18:
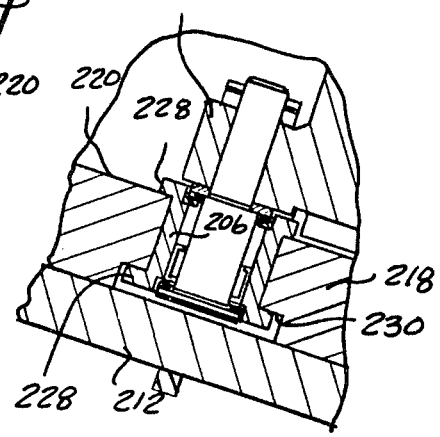

FIGS. 10-14 inclusive are schematic diagrams showing successive steps in the operation of a second embodiment of the invention applied to a simple part lifting operation;

FIG. 15 shows a carrier velocity-angular displacement curve for the drive schematically illustrated in FIGS. 10-14;

FIG. 16 is a side elevational view of a portion of a modified form of drive;

FIG. 17 is an end view of the structure shown in FIG. 16;

FIG. 18 is a detail cross-sectional view taken on line 18—18 of FIG. 16; and

FIGS. 19-23 are schematic diagrams showing successive steps in the operation of the mechanism shown in FIGS. 16-18.

In FIGS. 1 and 2, there are presented simplified schematic views of a lift and carry conveyor employing one form of drive embodying the present invention. The relates size and spacing between various portions of the drive shown in FIGS. 3-9 is such that it is not possible to show various details of all portions of the drive in a single figure and FIGS. 1 and 2 are intended to indicate the relationship of the various portions of the drive to each other while FIGS. 3-9 present details of individual portions of the drive.

The simplified schematically illustrated lift and carry conveyor shown in FIGS. 1 and 2 includes a stationary fixed frame 30 which fixedly supports a pair of spaced parallel horizontally extending support rails 32. Support rails 32 are formed with transversely aligned uniformly spaced V-shaped notches 34 which provide spaced cradles for receiving and located elongate cylindrical parts P upon support rails 32. A carriage platform 36 is shown in a lowered position in FIG. 1 and is mounted for vertical movement relative to fixed frame 20 by elevating mechanisms designated generally 38 which will be described in greater detail below. Elevating mechanisms 38 are driven to raise and lower platform 36 by one form of drive designated generally 40 embodying the present invention which will be described in greater detail below. A carrier platform including a pair of transversely spaced carrier rails 42 is mounted upon carrier platform 36 for horizontal movement relative to the platform, a hydraulic motor 43 mounted on platform 36 being coupled to carrier rails 42 to drive the rails 42 in movement relative to the platform.

In FIG. 1, the lift and carry conveyor is shown in its start or ready position, ready to begin a conveying cycle. Carriage platform 36 is at its lower end limit of movement and carrier rails 42 are at their extreme left-hand end limit of movement. In the first step of a conveying cycle, the lift drive 40 is actuated to drive the lift mechanisms 38 in an elevating stroke which vertically moves carrier platform 36 upwardly from the position shown in FIG. 1 to a position where carrier rails 42 are elevated upwardly above the top surface of stationary support rails 32. During this elevating stroke, the rails 42 move upwardly between the fixed support rails 32 and the parts P are engaged by carrier rails 42 and lifted upwardly clear of the fixed support rails 32, the parts P resting in V-shaped notches 44 formed in carrier rails 42. With the carrier rails 42 supported in this elevated position, motor 43 is actuated to drive rails 42 to the right as viewed in FIG. 1, this rightward stroke being of a length equal to the distance between V-shaped notches 34 in the fixed support rails. Carrier platform 36 is then lowered under the control of drive 40 and elevating mechanisms 38 to its original level, and during this lowering stroke support of the parts P is transferred back from carrier rails 42 to the fixed support rails 32 with the individual parts now being located one step to the right from the positions shown in FIG. 1. Motor 43 is then actuated to drive carrier rails 42 back to the left to the start position shown in FIG. 1.

Typically, in a lift and carry conveyor the carriage platform moves continuously through its elevating stroke and the carrier rails will engage the parts supported in stationary positions upon the support rails with an impact whose magnitude is directly dependent upon the upward velocity of the carrier rails at the moment of impact. A similar impact occurs during the lowering stroke of the carriage as the downwardly moving parts strike the fixed support rails. If the overall velocity of the carrier during its lifting and lowering strokes is reduced to minimize this impact, the conveyor cycle time is increased. Attempts to vary the vertical velocity of the carrier during the stroke so that the velocity is a minimum at the moment of impact face the problem that immediately after impact the carrier must be accelerated to regain velocity to minimize cycle time. In the lifting stroke this post impact acceleration must work against the increased load represented by the weight of the parts which are now supported upon the carrier and in most systems the elevating mechanism is operating at a reduced mechanical advantage at this point in the working stroke. A larger and more powerful drive motor may be required.

The drive 40 of the present application drives the carrier platform 36 in a so-called "soft touch" lifting and lowering cycle in which the vertical velocity of the carrier platform is momentarily reduced to zero at the moment of impact between the carrier and part (or between the part and stationary support rail during the lowering stroke) while enabling the motor powering the drive to drive continuously at a substantially constant speed throughout the entire lifting (or lowering) stroke. The drive is so designed, as will be described in more detail below, that the drive itself operates at a maximum mechanical advantage during those portions of its cycle when the carrier must be accelerated.

Figure 3:
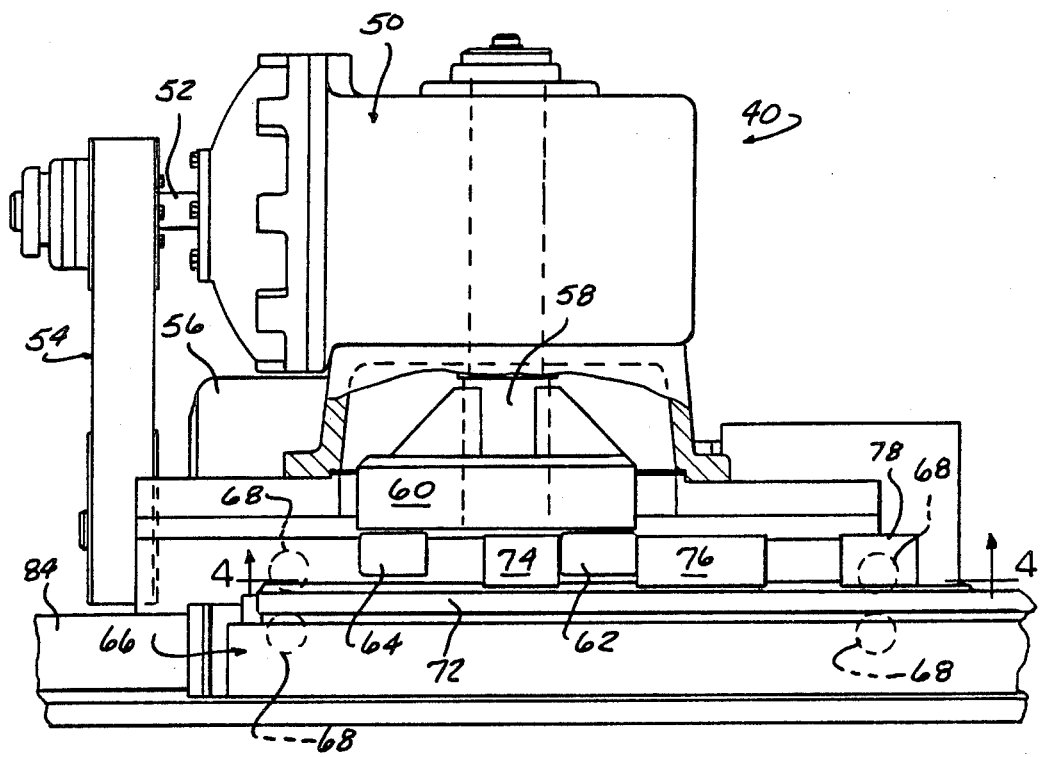
FIG. 3 is a side elevational view, with certain parts broken away or shown in section, of a portion of the drive employed in the conveyor of FIG. 1.
Figure 4:
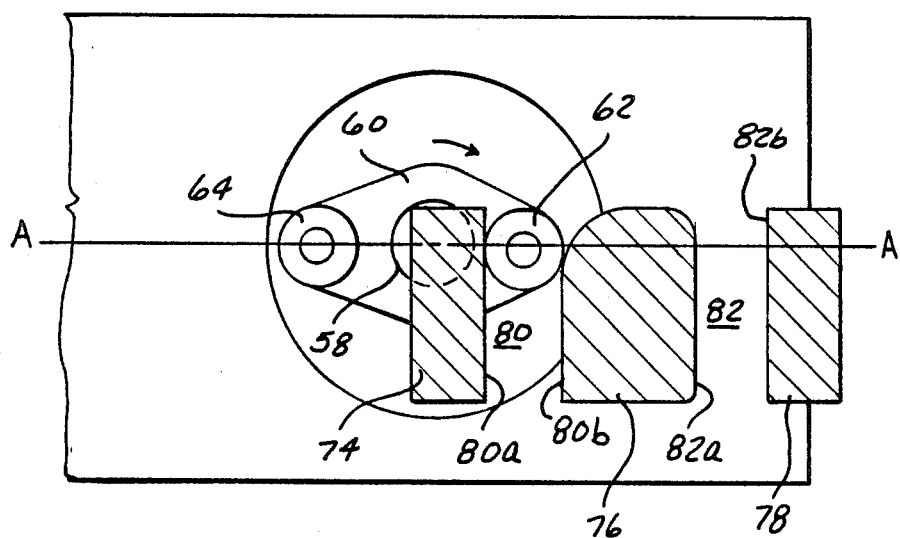
FIG. 4 is a detail cross-sectional view of a portion of the drive taken on line 4—4 of FIG. 3.
Figure 5:
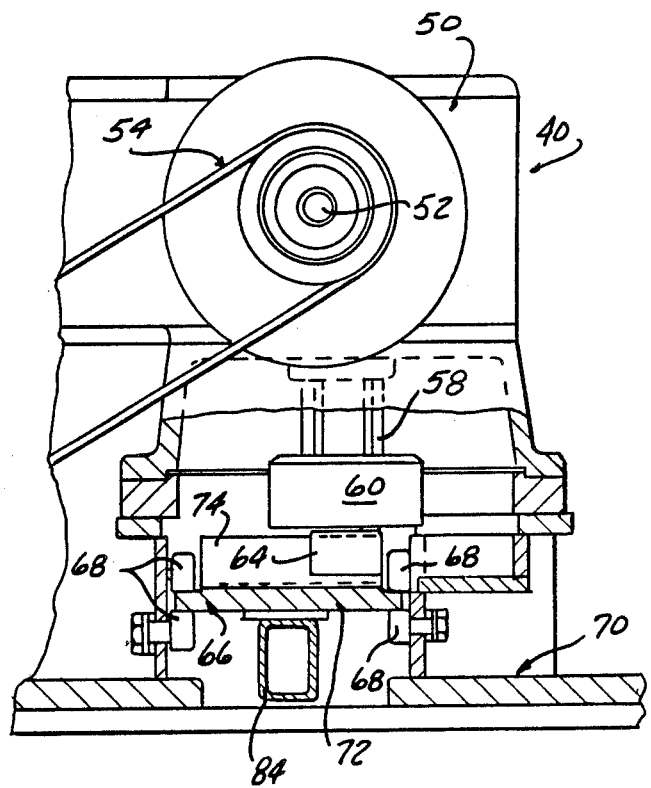
FIG. 5 is a partial end view, with certain parts broken away or shown in section, of that portion of the drive shown in FIG. 3.
Figure 6:
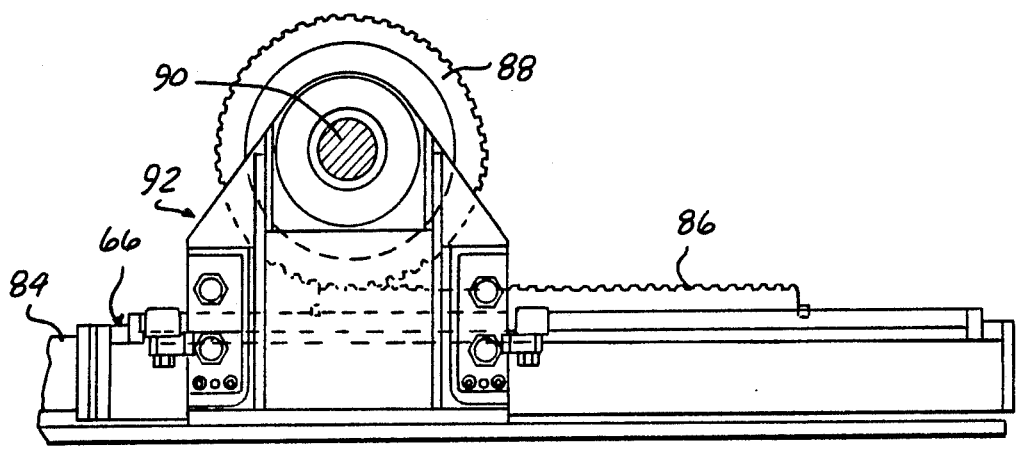
FIG. 6 is a detail cross-sectional view of another portion of the drive of FIG. 1 taken approximately on line 6—6 of FIG. 2.

Referring now particularly to FIGS. 3–5, the drive 40 includes a gear box 50 whose input shaft 52 is driven by a belt and pulley arrangement designated generally 54 which is in turn driven by a reversible drive motor 56. The output shaft 58 of gear box 50 is mounted for rotation about a fixed vertical axis and a rotary member 60 is fixedly mounted upon the lower end of shaft 58. A pair of rollers 62, 64, best seen in FIGS. 3 and 4, are mounted upon the underside of rotary member 60 for free rotation about respective roller axes which are parallel to the axis of shaft 58 and radially offset from the axis of shaft 58 at diametrically opposite sides of the shaft.

A motion transmission member designated generally 66 is mounted for horizontal movement relative to fixed frame 70 as by rollers 68 best shown in FIG. 5. Motion transmission member 66 includes a horizontally disposed plate 72 whose opposite side edges are received between rollers 68. On the upper side of plate 72, three abutment blocks 74, 76, 78 are fixedly mounted to project upwardly from plate 72. As best seen in FIG. 4, a first roller receiving slot 80 is defined between abutment members 74 and 76 and a second roller receiving slot 82 is defined between abutment members 76 and 78. The opposed side walls 80a and 80b of slot 80 lie in parallel general planes which are perpendicular to the path of movement of motion transmission member 66, as do the opposed side walls 82a and 82b of slot 82. The opposed side walls of the slots are spaced from each other by a distance which slightly exceeds the outer diameter of rollers 62, 64 so that the rollers may roll along one side wall of the slot with a slight clearance from the opposite side wall. The center to center distance between slots 80 and 82 is equal, within a slight manufacturing tolerance, to the distance between the axes of rotation of rollers 62 and 64.

As best seen in FIGS. 1 and 2, a rigid bar 84 is fixedly secured to the underside of plate 72 of motion transmission member 66 to project forwardly and rearwardly from opposite sides of drive 40. At the opposite ends of bar 84, a horizontally extending rack tooth section 86 is fixedly mounted on the bar to mesh with a pinion gear 88 fixedly mounted upon a shaft 90 which extends transversely of the conveyor and is supported for rotation about a fixed horizontal axis as by bearing mounts, 92. As best seen in FIG. 2, pinion gear 88 is located centrally of shaft 90 which projects from opposite sides of gear 88 to couple pinion 80 to the elevating mechanisms 38. The four elevating mechanisms 38 are of similar construction, and the following description is equally applicable to all.

Figure 7:
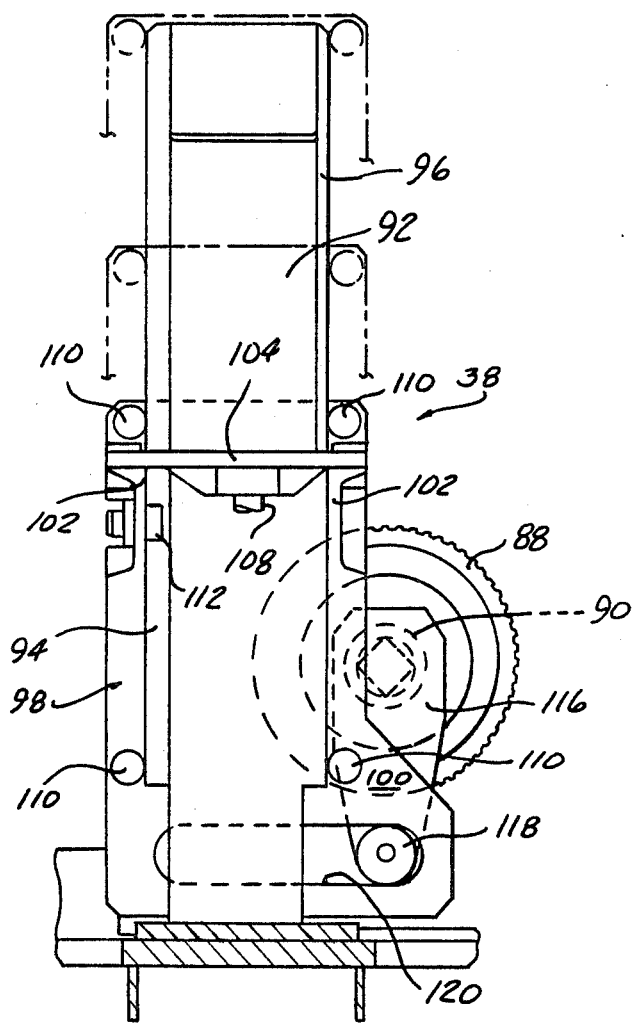
FIG. 7 is a side elevational view of another portion of the drive of the conveyor of FIG. 1 taken approximately from line 7—7 of FIG. 2.
Figure 8:
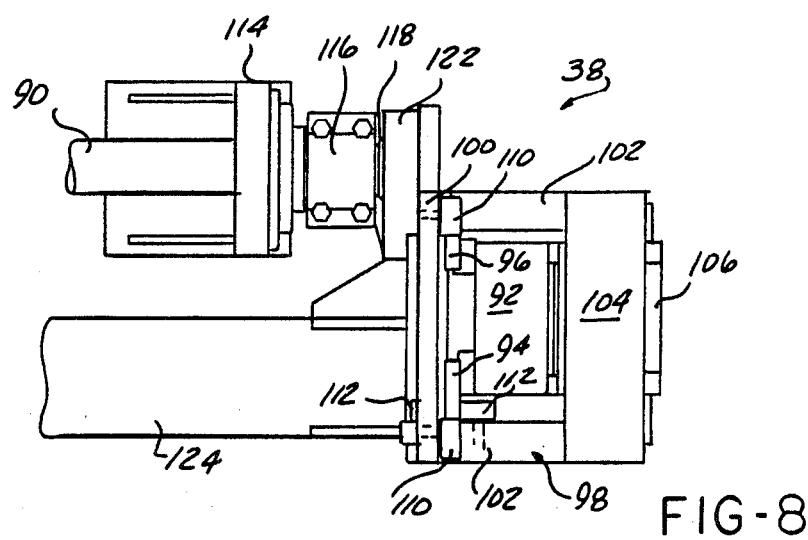
FIG. 8 is a top plan view of a portion of the structure shown in FIG. 7.
Figure 9:
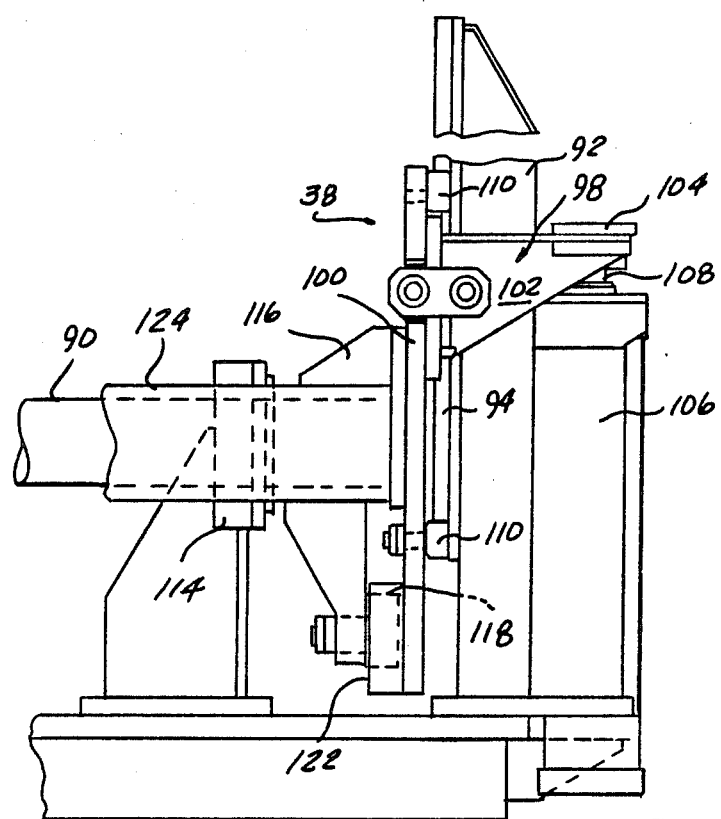
FIG. 9 is an end view of the structure shown in FIG. 8.

Referring now to FIGS. 7–9, each elevating mechanism 38 includes a stationary rigid vertically extending frame post 92 which is fixedly mounted upon the conveyor frame. At the side of post 92 facing the conveyor center line, vertically extending plate-like guide rails 94, 96 are fixedly mounted upon the post as best seen in FIGS. 7 and 8.

An elevating frame assembly designated generally 98 is mounted upon post 92 for vertical movement guided by the post. Frame 98 includes a main plate 100 located at the inner side (with respect to the conveyor center line) of post 92. A pair of brackets are fixedly secured, as by welding, to project outwardly from plate 100 at opposite sides of post 92 to support a rigid cross frame member fixedly secured to and extending between the outer ends of brackets 102 outwardly of post 92. A pneumatic motor including a cylinder 106 (FIG. 9) and piston rod 108 is engaged between the conveyor frame and the underside of cross member 104 to counterbalance the weight of the vertically movable portions of the elevator mechanism. A plurality of rollers 110 mounted upon plate 100 engage the side edges of guide rails 94, 96 to guide frame 98 in vertical movement relative to the post while an additional pair of rollers 112 mounted on one of the brackets 102 engage the inner and outer sides of guide rail 94 to assist in vertically guiding the elevator frame 98.

Shaft 90, which is rotatably fixed relative to drive pinion 88, (FIG. 7) passes through a bearing assembly 114 (FIGS. 8 and 9) and a radially projecting crank arm 116 is fixedly secured to the outer end of shaft 90. Crank 90 carries a roller 118 at its distal end which projects outwardly from the crank to be received within a horizontal slot 120 (FIG. 7) formed in a thickened portion 122 at the lower end of plate 100.

Referring now to FIG. 7, if pinion 88 is rotated in a clockwise direction, crank 116 will likewise be driven in a clockwise direction from the position shown in FIG. 7 because the crank is rotatably fixed to the pinion 88 by shaft 90. The engagement of roller 118 carried by the crank with the upper wall of slot 120 will transmit the vertical component of movement of the roller to plate 100 and hence elevating frame 98 to cause the frame to elevate from the position shown in FIG. 7 upwardly to the various broken line positions indicated in that figure. Maximum elevation of frame 98 will occur when crank 116 has been rotated 180° from the six o'clock position relative to shaft 90 shown in FIG. 7 to a twelve o'clock position. This 180° rotation of the crank will lift carrier platform 36 from its lowered position to its elevated position. Elevating frame 98 is connected to the elevating carriage 36 by means of a cross frame member 124 (FIGS. 8 and 9) which extends from the elevating frame 98 of an elevating mechanism 38 at one side of the conveyor to the elevating frame 98 of the elevating mechanism at the opposite side of the conveyor. Suitable framework only schematically illustrated in FIGS. 1 and 2 will mount the elevating carriage 36 upon the cross frame members 124.

OPERATION OF THE DRIVE OF FIGS. 1–9

In FIG. 4, rotary member 60 is shown in a start position in which the drive is ready to commence a lifting cycle to elevate carrier platform 36 from the lowered position shown in FIG. 1. At this time the two pinion gears 88 (FIG. 1) will be meshed with the left-hand ends of their associated rack sections 86 as viewed in FIG. 1, see also FIG. 6. The various crank arms 116 of all of the elevating mechanisms 38 will be in the six o'clock position as illustrated in FIG. 7, thus locating the various elevator frames 98 and the carrier platform 36 (FIG. 1) at their lower end limits of movement.

Returning now to FIG. 4, it will be noted that in the start position of rotary member 60 shown in FIG. 4, the axes of rollers 62 and 64 and the axis of rotation of rotary member 60 all lie on a common straight line AA which is parallel to the path of movement of motion transmission member 66. Roller 62 at this time is located near one end of the slot 80 and tangentially engages the wall 80a of this slot at the point at which line AA crosses slot wall 80a.

Motor 56, which drives shaft 58 and rotary member 60 in rotation, is programmed to drive in discrete rotary cycles in which the direction of rotation is alternated in successive cycles. During each rotary cycle, motor 56 drives rotary member 60 in one complete 360° rotation continuously at a substantially constant speed. Gear box 50 is a step down gear box and a programmed clutch-brake assembly, not shown, may be employed in the drive train between motor 56 and shaft 58 to assure that rotary member 60 is rotated precisely 360° and stopped during each rotary cycle of motor 56. During each rotary cycle, motor 56 rotates at constant speed, hence the rate of rotation of rotary member 60, while being driven by motor 56, will be substantially constant throughout its 360° rotation.

Referring now to FIG. 4, the rotary member is shown in its start position, ready to drive in a carriage elevating cycle. In a carrier platform elevating cycle, rotary member 60 is driven from the position shown in FIG. 4 in a clockwise direction as viewed in that figure. As this rotation commences, roller 62 will move downwardly from its three o'clock position relative to shaft 58 shown in FIG. 4 and to the left as viewed in FIG. 4, thus rolling downwardly along wall 80a of slot 80 and forcing abutment member 74, and hence the entire motion transmission member 66, to the left as viewed in FIG. 4. As roller 62 is rotated past the six o'clock position as viewed in FIG. 4, it will begin to roll back upwardly along slot wall 80a until it reaches the nine o'clock position as viewed in FIG. 4. At this time, the various abutment members will have been moved to the left a sufficient distance such that the other roller 64, which is now at the three o'clock position relative to shaft 58 will move downwardly into the upper end of slot 82 as viewed in FIG. 4. The walls 80b and 82a at this end of slots 80 and 82 may be rounded off as shown in FIG. 4 to provide clearance for movement of the rollers into and out of the slots.

It is believed apparent that only the horizontal component of movement of roller 62 as viewed in FIG. 4 is transmitted to transmission member 56, and this velocity, for a constant rotary speed of shaft 58 will be equal to R sine D where R is the distance between the axes of shaft 58 and roller 62 and D is the angular displacement of roller 62 from its start position. The velocity of transmission member 66 is thus zero when roller 62 is displaced 180° from its start position.

Further clockwise rotation of rotary member 60 beyond the 180° position will carry roller 62 above the line AA as viewed in FIG. 4, while roller 64 will move into slot 82, engage wall 82a and continue to drive motion transmission member 66 to the left.

This leftward movement of motion transmission member 66 causes the rack teeth 86 at the opposite ends of the member to drive the pinions 88 in clockwise direction, as viewed in FIG. 1, and this motion is transmitted by the cranks 116 of the various elevating mechanisms 38 to their elevating frames to lift the carrier platform. Gear 88 is chosen so that crank 116 is rotated 180° from the position shown in FIG. 7 in response to the stroke of motion transmission member 66 induced by a 360° rotation of rotary member 60.

The program of motor 56 is such that motor 56 drives in a first rotary cycle, then stops for a period of time sufficient for the conveyor carrier to drive in its forward stroke. Motor 56 is then actuated to drive in a second rotary cycle in a reversed direction of rotation which drives rotary member 60 360° in the reverse direction to return the motion transmission member to its original start position, thus lowering the conveyor carrier from its elevated position to its lowered position. Motor 56 is again stopped for a time sufficient for the conveyor carrier to be driven in its return stroke back to the original start position.

EMBODIMENT OF FIGS. 10-14

In FIGS. 10-14, a rotary member 60' is mounted for rotation about a fixed axis 58' and carries rollers 62', 64' at its opposite ends. This schematic representation uses primed reference numerals to designate parts corresponding to those of the FIG. 1-9 embodiment. In the arrangement of FIGS. 10-14, a motion transmission member 66 is mounted for vertical movement and supports a part carrier C at its upper end. Transmission member 66' is formed with two horizontally extending roller receiving slots 80', 82' analogous to the slots 80 and 82 of FIG. 4. A part P to be elevated is supported upon a fixed support S in the path of movement of carrier C.

In FIG. 10 the system is shown in its start position with roller 62' just barely received within one end of the uppermost slot 80'. This position will be defined as a zero degree displacement of rotary member 60' from its start position.

In FIG. 11, rotary member 60' has been rotated 90° in a counterclockwise direction from its position in FIG. 10, and in so doing has elevated transmission member 66' from the FIG. 10 position.

In FIG. 12, rotary member 60' has rotated 180° from the FIG. 10 position, and at this time transmission member 66' has been elevated to a position such that the carrier C has just moved into contact with the part P supported on stationary support S. At this 180° position, roller 62' is at one end of slot 80', while roller 64' has just moved into the corresponding end of slot 82'.

In FIG. 13, rotary members 60' has been rotated 270° from the FIG. 10 position, roller 62' is entirely disengaged from member 66' which at this time is being driven upwardly by the engagement of roller 64' in slot 82'.

In FIG. 14, rotary member 60' has rotated a full 360° from its start position shown in FIG. 10, transmission member 66' is at its extreme upward limit of movement with part P supported by the carrier at a predetermined elevation above support S.

It is believe apparent that if rotary member 60' is rotated 360° in a clockwise direction from its FIG. 14 position, the mechanism will be restored to the FIG. 10 relationship.

In the foregoing description, it is assumed that the rate of rotation of rotary member 60' about its axis 58' is constant throughout each single 360° rotation. With this constant velocity, the carrier velocity curve of FIG. 15 will follow a sine curve, and be momentarily reduced to zero when the rotary member is displaced 180° from its start position. The vertical displacement of carrier C from the start position of FIG. 10 through the first 180° of rotation of rotary member 60' from its start position is twice the radial displacement of roller 62' from the fixed axis 58' while the vertical displacement during the final 360° of revolution of member 60' is equal to twice the radial distance between axis 58 and the axis of roller 64'. Because the radial distance from axis 58 to the respective rollers 62' and 64' need not be equal, the point within the vertical stroke of carrier C at which the carrier moves into engagement with the part P need not be the precise midpoint of the stroke.

In the mechanism schematically illustrated in FIGS. 10-14, the rollers 62' and 64' of rotary member 60' drive a motion transmission member 66' which is coupled directly to the carrier C and thus the resultant carrier velocity is dependent only upon the motion of the transmission member 66'. In this particular relationship, the carrier velocity follows a sine curve through each half revolution.

In the arrangement of FIGS. 1-9, motion of the motion transmission member 66' is transmitted to the vertically moving carrier platform 36 via gear 88, crank arm 116 and the roller slot coupling 118, 120 (FIG. 7) to the vertically moving carrier. In this somewhat more complex mechanical arrangement, the rotary velocity of gear 88 is not a constant velocity, but instead varies sinusoidaly with respect to the angular displacement of rotary member 60 from its start position. The rotary velocity of crank 116 is the same as gear 88, however, only the vertical component of this angular velocity is transmitted to carrier 36. While a carrier velocity versus angular displacement curve such as that of FIG. 15 for the mechanism of FIGS. 1-9 will be more complex that the simple sinusoidal variation shown in FIG. 15, the vertical velocity of carrier 36 will be reduced to zero at the instant rotary member 60 has moved 180° from its start position, because at this instant motion transmission member 66 is stationary, and therefore gear 188 and crank arm 116 must be stationary.

Thus, the arrangement of FIGS. 1-9 enables a constant speed rotary input to drive carrier 36 in a vertical stroke at which the vertical velocity of carrier 36 is momentarily reduced to zero at some predetermined intermediate position within the stroke. This particular position is determined, in the simplified mechanism of FIGS. 10-14 by the ratio of the radial distances between axis 58' and rollers 62' and 64' respectively. In the mechanically more complex mechanism of FIGS. 1-9, the radius of gear 88 and the radial distance between the axis of shaft 90 and the axis of roller 118 are further factors in establishing the point within the vertical stroke of carrier 36 when the vertical velocity of the carrier is momentarily reduced to zero. This point is, of course, chosen to be the point within the vertical stroke of the carrier at which the carrier engages the part P.

The geometry of the relationship of rotary member 60, rollers 62, 64 and motion transmission member 66 is such that regardless of the mechanism which may be coupled between member 66 and the carrier, the reduction of the carrier velocity to zero occurs when rotary member 60 (or 60') is displaced 180° from its start position. From FIG. 12, it is seen that at this point rotary member 60' is in a relationship to motion transmission member 66' such that as rotary member 60' begins to rotate away from the 180° position, it is acting upon motion transmission member 66' with a maximum mechanical advantage. In the direct coupling of motion transmission member 66' to the carrier as in FIGS. 10-14, the full benefits of this arrangement are realized in that the system operates at a maximum mechanical advantage at that position within the vertical stroke of the carrier at which the carrier must be accelerated upwardly from a dead stop.

EMBODIMENT OF FIGS. 16-23

The embodiment of FIGS. 16-23 differs from that of FIGS. 1-9 in that the motion transmission member driven by a rotary member carrying two radially offset rolles is mounted for rotary oscillation about a fixed axis and is coupled directly to the vertically moving carrier by a simple link connection.

Referring now particularly to FIGS. 16 and 17, a fixed frame designated generally 200 supports a drive shaft 202 (FIG. 17) for rotation about a fixed horizontal axis. At one end of shaft 202, a rotary member 204 is fixedly mounted upon the shaft and carries two rollers 206, 208 which are mounted at the outer side of member 204 for rotation about respective roller axes parallel to and radially offset from the axis of shaft 202. Shaft 202 is driven in rotation by a reversible drive schematically indicated at 210 in FIG. 17. The drive 210 of the FIG. 16-23 embodiment may be assumed to be identical to the drive for shaft 58 of the FIG. 1-9 embodiment described in more detail above.

A motion transmission member 212 is fixedly mounted upon a shaft 214 mounted for free rotation in frame 200 as by a bearing assembly 216 (FIG. 17). Shaft 214 is disposed with its axis in a fixed horizontal position parallel to and in vertical alignment with the axis of rotation of shaft 202.

On the side of motion transmission member 212 facing rotary member 204, three abutment blocks 218, 220 and 222 are fixedly mounted to define two roller receiving slots 224, 226 (FIG. 16) which extend radially from the axis of rotation of member 212 upon frame 200. As in the embodiment of FIGS. 1-9, the width of slots 218 and 226 slightly exceeds the diameter of rollers 206, 208 so that upon rotation of member 204, as in the previously described embodiment, the rollers may roll along one wall of the slot with a slight clearance from the opposite wall. Referring briefly to FIG. 18, the opposite ends of the rollers are formed with radial flanges 228 seated in an undercut 230 and against the exposed face of the abutment members to prevent axial displacement of transmission member 212 relative to the rollers when member 212 is under load.

A projecting arm portion 232 (FIG. 16) of member 212 is coupled, by means of a C-shaped link 234 to an elevating frame 236, upon which a carrier platform such as 36 of the FIGS. 1-9 embodiment may be fixedly mounted. Link 234 is coupled to transmission member 212 by a pivot 238 and to the vertically movable elevating frame 236 as by a pivot 240. A bracket 242 fixedly mounted upon elevating frame 236 carries a roller 244 which rides in a slot 246 in a fixed vertically extending guide rail 248. Elevating frame 236 is thus constrained for vertical movement, while link 244 accommodates the curved path of arm 232 (centered on shaft 214) to this straight line movement.

A pneumatic counterbalance cylinder 250 pivotally mounted on frame 200 has it piston rod 252 pivotally coupled to motion transmission member 212 at pivot 254. Cylinder 250 is pressurized to exert an upward force upon its piston rod 252 which will counterbalance the dead weight of elevating frame 236 and the carrier structure supported upon frame 236.

A second arm 256 may be formed upon transmission member 212 so that the member 212 may be coupled to the corresponding member of another drive as by a drag link to coordinate the movement of the two motion transmission members.

As in the previously described embodiment of FIGS. 1-9, the drive of rotary member 204 is programmed to drive in discrete revolutionary cycles in which member 204 is rotated through a single 360° revolution from a start position in a first rotary cycle and, after a time delay, rotated 360° in the opposite direction during the following cycle. Abutment members 218 and 222 are provided with stop surfaces as at 258 and 260 which will respectively engage rollers 208 and 206 at the respective ends of each 360° revolution of member 204.

Referring now to FIGS. 19-23, a schematic illustration of the sequential steps of movement of motion transmission member 212 during a 360° revolution of rotary member 204 is shown. In the start position shown in FIG. 19, roller 206 is just engaged in the top of slot 224 between abutment members 218 and 220. Motion transmission member 212 in this position is at its extreme clockwise end limit of movement of rotation relative to the fixed axis of shaft 214.

Upon counterclockwise rotation of rotary member 204, roller 206 rolls down the left-hand side of abutment 218 and in so doing, forces abutment member 218 to the right, thus driving transmission member 212 in counterclockwise rotation about axis 214. In FIG. 20, roller 206 is displaced 90° from its position in FIG. 19 and has reached substantially the lower end of slot 224. A further rotation of 90° brings the rotary member 204 to the position of FIG. 21, at which time roller 206 has returned to the upper end of slot 224, while roller 208 is now moving downwardly into the top of slot 226. At this position, the direction of movement of the two rollers is essentially parallel to the walls of the slots and the angular movement of member 212 about its rotational axis 214 is reduced to zero.

As counterclockwise rotation of member 204 continues from the FIG. 21 position, roller 206 is rotated upwardly clear of slot 224, while roller 208 moves downwardly into slot 226 and rolls along the left-hand side of abutment member 220 to continue driving transmission member 212 in counterclockwise rotation about axis 214. At the completion of a 360° revolution, shown in FIG. 23, roller 206 swings downwardly onto abutment surface 260 as the 360° revolution is completed. As explained above, the drive from drive 210 to the rotary member shaft 202 stops at this instant. After a predetermined delay, drive 210 acts to drive rotary member 204 360° in a clockwise direction, this action driving transmission member 212 in clockwise movement about its axis of rotation 214 in the reverse of the sequence described above. As in the previous case, the rate of rotation of rotary member 204 is substantially constant throughout each rotary cycle. With a constant speed of rotation of member 204, the angular velocity of motion transmission member 212 about its axis 214 varies approximately sinusoidally with the angular displacement of rotary member 204 from its start position. The term "approximately sinusoidally" is used because the radial distance from axis 214 to the point at which the periphery of the roller 206 (or 208) engages the abutment member in turn varies with the angular displacement of member 204, however, as in the previous cases the motion imparted to member 212 by rollers 206 and 208 is reduced to zero as the direction of motion of the roller axis becomes parallel to the engaged surface of the abutment member. This parallelism momentarily occurs at a 180° displacement of rotary member 204 from its start position, and at this instant member 212 is momentarily stationary. The vertical velocity of the carrier is essentially the vertical component of movement of the arm 232 of member 212, the word "essentially" being used because some of this vertical component of motion is absorbed by the pivoting movement of link 234 (FIG. 16). However, the objective of momentarily reducing the upward velocity of lifting frame 236 to zero at a selected point in its vertical stroke is achieved.

While various embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. In an article handling apparatus including article transfer means mounted for movement along a first fixed path between a rest position at one end of said first fixed path and an extended position at the opposite end of said first fixed path, article support means for supporting an article at an intermediate position on said first fixed path, and drive means for driving said transfer means in a working stroke from said rest position to said extended position and to subsequently drive said transfer means in a return stroke back to said rest position, said transfer means being operable during said working stroke to engage an article at said intermediate position and carry the engaged article from said intermediate position to said opposite and of said first fixed path;

the improvement wherein said drive means comprises a rotary member mounted for rotation about a fixed axis, reversible motor means operable to drive said rotary member in rotation about said fixed axis in discrete single revolution cycles of 360° at a substantially constant rotary speed with the direction of rotation of said rotary member during each cycle being reversed from its direction of rotation during the preceding cycle, and motion transmitting means coupling said rotary member to said transfer means to drive said transfer member in a working stroke upon rotation of said rotary member through a first single revolution cycle and to drive said transfer member in a return stroke upon rotation of said rotary member through the next following single revolution cycle, said motion transmitting means including means for reducing the speed of movement of said transfer means momentarily to zero when said transfer means arrives at said intermediate position.

2. The invention defined in claim 1 wherein said motion transmitting means comprises a motion transmitting member mounted for movement along a second fixed path lying in a first general plane normal to said fixed axis, first and second abutment means fixedly mounted at spaced locations on said motion transmitting member, first and second drive members mounted on said rotary member at respective locations radially offset from said fixed axis such that said first drive member engages said first abutment means through one half of a single revolutionary cycle of said rotary member and said second drive member engages said second abutment means through the other half of the same single revolutionary cycle of said rotary member.

3. The invention defined in claim 2 wherein said first and second drive members respectively comprise a first and a second roller mounted upon said rotary member for rotation about respective first and second roller axes parallel to said fixed axis at fixed radial distances from said fixed axis, and said first and second abutment means each comprises a pair of spaced opposed parallel abutment surfaces lying in general plane normal to said second fixed path, the abutment surfaces of said first abutment means defining the opposed walls of a first roller receiving slot of a width slightly exceeding the diameter of said first roller and a length approximately the radial distance between said fixed axis and said first roller axis and the abutment surfaces of said second abutment means defining the opposed walls of a second roller receiving slot of a width approximately the diameter of said second roller and a length slightly exceeding the radial distance between said fixed axis and said second roller axis, said first roller being located at one end of said first slot at the start and finish of the first half of said first single revolution cycle and said second roller being located at the corresponding end of said second slot at the start and finish of the second half of said first single revolution cycle.

4. The invention defined in claim 3 wherein said second fixed path is a straight line path, said first and second roller axes being spaced 180° apart from each other about said fixed axis.

5. The invention defined in claim 4 wherein said first roller axis is at a radial distance r1 from said fixed axis and said second roller axis is at a radial distance r2 from said fixed axis such that $r1/r2 = d1/d2$ where d1 equals the distance along said fixed path from said rest position to said intermediate position and d2 equals the distance along said fixed path from said intermediate location to said extended position.

6. In an article handling apparatus including support means for supporting an article at a ready position, article carrier means mounted for movement in a working stroke along a first fixed path from a retracted position wherein said carrier means is spaced below an article supported at said ready position by said support means and an elevated position wherein said carrier means is operable to support an article at a first location spaced above said ready position, said carrier means during movement from said retracted position to said extended position being operable to lift an article supported by said support means at said ready position from said support means and elevate the article to said first location, and drive means for driving said carrier means from said retracted position to said extended position;

the improvement wherein said drive means comprises a rotary member mounted for rotation about a first fixed axis, motor means operable to drive said rotary member in a drive cycle wherein said rotary member is rotated in a single 360° revolution about said first fixed axis at a substantially constant speed from a predetermined start position, and motion transmitting means coupling said carrier means to said rotary member to locate said carrier means in said retracted position when said rotary member is in said start position and to drive said carrier means in a complete working stroke in response to the rotation of said rotary member in a single drive cycle while varying the speed of movement of said carrier means during its working stroke to momentarily reduce the speed of said carrier means to zero as said carrier means engages an article at said ready position.

7. The invention defined in claim 6 wherein said motion transmitting means comprises a first and a second roller mounted on said rotary member for rotation about respective first and second roller axes located in spaced parallel relationship to said first fixed axis at approximately diametrically opposed positions, a motion transmission member mounted for movement along a second fixed path lying in a general plane normal to said first fixed axis and coupled to said carrier means to drive said carrier means in a working stroke in response to movement of said transmission member along said second fixed path from a first end limit to a second end limit, first abutment means on said transmission member engageable with said first roller for driving said transmission member from said first end limit to a first location on said second fixed path intermediate said first and second end limits in response to the rotation of said rotary member through the first half of a drive cycle, and second abutment means on said transmission member engageable with said second roller for driving said transmission from said first location to said second end limit in response to the rotation of said rotary member through the second half of a drive cycle.

8. The invention defined in claim 7 wherein said second fixed path is a straight line path and said first and second roller axes and said first fixed axis lie in a common general plane, said first and second abutment means comprising first and second abutment surfaces lying in general planes normal to said second fixed path and to said common general plane when said rotary member is in said start position, and the side of said first roller means adjacent said fixed axis tangentially engages said first abutment surface at one end thereof when said rotary member is in said start position and said transmission member is at said first end limit.

9. The invention defined in claim 8 wherein said first and second rollers are of like diameter, said second abutment surface is spaced from said first abutment surface by a distance equal to the distance between said first and second roller axes, and said first and second rollers are simultaneously engaged with the respective first and second abutment surfaces only when said rotary member is displaced 180° from its start position.

10. The invention defined in claim 9 wherein said carrier means is fixedly mounted on said transmission member.

11. The invention defined in claim 9 further comprising a pinion mounted for rotation about a fixed horizontal axis, rack means on said transmission member meshed with said pinion for driving said pinion in rotation about said horizontal axis in response to movement of said transmission member along said second fixed path, and means responsive to rotation of said pinion for driving said carrier means in a working stroke.

12. The invention defined in claim 7 wherein said motion transmission member is mounted for rotation about a horizontal second fixed axis parallel to and spaced above said first fixed axis, said first and second abutment means comprising first and second abutment surfaces lying general planes substantially normal to said second fixed path and extending radially outwardly from an arc centered at said second fixed axis and passing through said first fixed axis, and the side of said first roller axis adjacent said fixed axis tangentially engages the radially inner end of said first abutment surface when said rotary member is in said start position and said transmission member is at said first end limit.

13. The invention defined in claim 12 wherein said second abutment surface is angularly displaced about said second fixed axis by an angle such that said first and second rollers are simultaneously respectively engaged with said first and second abutment surfaces when said rotary member is displaced 180° from its start position.

14. The invention defined in claim 12 or claim 13 further comprising link means coupling said transmission member to said carrier means.

15. In an article handling apparatus including support means for supporting an article at a ready position, carrier means mounted for upward and downward movement along a fixed vertical path between a lowered position spaced below an article supported at said ready position and an elevated position wherein said carrier means is operable to support an article at a first position spaced above said support means, said carrier means during movement from said lowered position to said elevated position being operable to lift an article supported by said support means at said ready position from said support means to said first position being operable during movement from said elevated position to said retracted position to lower an article from said first position onto said support means prior to the arrival of said carrier means at said lowered position, and drive means operable to drive said carrier means in a working stroke from said lowered position to said elevated position and in a return stroke from said elevated position to said lowered position;

the improvement wherein said drive means comprises a motion transmission member mounted for forward and rearward movement along a second fixed path lying in a first general plane, means coupling said transmission member to said carrier means to drive said carrier means upwardly in response to forward movement of said transmission member and downwardly in response to rearward movement of said transmission member, abutment means defining a first elongate slot in one side of said transmission member and a second elongate slot in said one side of said transmission member spaced rearwardly of said transmission member from said first slot, said first and second slots each having elongate forward and rearward opposed side walls lying in general planes normal to said second fixed path and said one side of said transmission member lying in a second general plane parallel to said first general plane, a rotary member mounted adjacent said one side of said transmission member for rotation about a first fixed axis normal to said first general plane, a first and a second roller mounted on said rotary member at substantially diametrically opposed positions for rotation about respective first and second roller axes parallel to and spaced from said first fixed axis said rollers projecting axially from said rotary member beyond said second general plane being of a diameter slightly less than the width of said slots to enable a roller to roll along one wall of a slot with a slight clearance from the opposite wall, said slots being spaced from each other by a distance equal to the distance between said first and second roller axes and being located with respect to said first fixed axis such that during a single 360° revolution of said rotary member about said fixed axis from a normally maintained home position said first roller is disposed within said first slot for one half of said single revolution and said second roller is disposed within said second slot for the other half of said single revolution, and reversible motor means operable to drive said rotary member in discrete single revolution cycles of 360° rotation from and to said home position, said motor means driving said rotary member in a forward direction of rotation in a first cycle and in the reverse direction of rotation in the next cycle.

* * * * *